United States Patent
Kubota et al.

(10) Patent No.: US 8,757,691 B2
(45) Date of Patent: Jun. 24, 2014

(54) HAND AND ROBOT

(75) Inventors: Yoshiaki Kubota, Fukuoka (JP); Yoichiro Dan, Fukuoka (JP); Jun Tijiwa, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 229 days.

(21) Appl. No.: 13/238,347

(22) Filed: Sep. 21, 2011

(65) Prior Publication Data
US 2012/0074724 A1    Mar. 29, 2012

(30) Foreign Application Priority Data

Sep. 24, 2010 (JP) .................................. 2010-214071

(51) Int. Cl.
*B25J 15/00* (2006.01)

(52) U.S. Cl.
USPC ............... 294/213; 294/2; 294/119.1; 901/31

(58) Field of Classification Search
USPC .......... 294/104, 106, 108, 2, 198, 203, 213, 294/119.1; 901/31, 32, 38, 39; 414/783
See application file for complete search history.

(56) References Cited

U.S. PATENT DOCUMENTS

| | | | | |
|---|---|---|---|---|
| 2,390,293 | A * | 12/1945 | Colson | 294/86.41 |
| 3,438,510 | A | 4/1969 | Fawell | |
| 3,655,232 | A * | 4/1972 | Martelee | 294/67.33 |
| 4,042,122 | A * | 8/1977 | Espy et al. | 414/728 |
| 4,579,380 | A * | 4/1986 | Zaremsky et al. | 294/119.1 |
| 4,699,414 | A * | 10/1987 | Jones | 294/119.1 |
| 6,994,510 | B2 * | 2/2006 | Cooke | 414/626 |

FOREIGN PATENT DOCUMENTS

| | | |
|---|---|---|
| DE | 1506525 | 7/1969 |
| EP | 0999170 | 5/2000 |
| JP | 01-274987 | 11/1989 |
| JP | 03-065687 U | 6/1991 |
| JP | 03-239491 | 10/1991 |
| JP | 06-021877 | 1/1994 |
| JP | 2003-1596684 | 6/2003 |
| JP | 2004-042214 | 2/2004 |
| JP | 2008-068367 | 3/2008 |
| JP | 2009-148846 | 7/2009 |
| WO | WO 2009/157190 | 12/2009 |

OTHER PUBLICATIONS

Extended European Search Report for corresponding EP Application No. 11180431.6-2316, Dec. 13, 2011.
Japanese Office Action for corresponding JP Application No. 2010-214071, Sep. 30, 2013.

* cited by examiner

*Primary Examiner* — Paul T Chin
(74) *Attorney, Agent, or Firm* — Ditthavong Mori & Steiner, P.C.

(57) ABSTRACT

A hand includes: a pair of supporters; first and second gripping claws which are supported inside of the pair of supporters, respectively, so as to grip a bolt; an oscillating mechanism which oscillates the first and second gripping claws on an oscillatory axis crossing a longitudinal direction of each of the supporters, so as to change the orientation of a tip of each of the first and second gripping claws; and a bolt rotating mechanism for rotating, on the axis of the bolt, the bolt gripped by the first and second gripping claws.

15 Claims, 10 Drawing Sheets

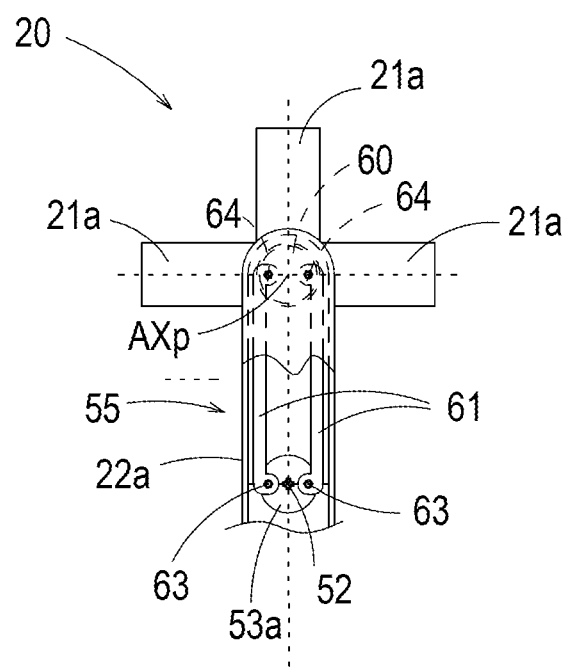

HAND AND ROBOT

CROSS-REFERENCE TO RELATED APPLICATIONS

The present application claims priority under 35 U.S.C. §119 to Japanese Patent Application No. 2010-214071 filed Sep. 24, 2010. The contents of this application are incorporated herein by reference in their entirety.

BACKGROUND OF THE INVENTION

1. Field of the Invention

The present invention relates to a hand and a robot.

2. Discussion of the Background

The gazette of Japanese Unexamined Patent Publication No. 1991-239491, for example, discloses a robot hand for use in a fitting operation or the like. The robot hand is provided with a finger having a grip for gripping a component part. The grip is rotatably supported by the finger. The finger includes drive means for rotating the grip. Furthermore, the finger includes detecting means for detecting a positional change in a rotational direction of the grip in which a component part is gripped by the grip so as to actuate the drive means in such a manner as to correct the positional change.

SUMMARY OF THE INVENTION

A hand according to one embodiment of the present invention includes: a pair of supporters; first and second gripping claws which are supported inside of the pair of supporters, respectively, so as to grip a bolt; an oscillating mechanism which oscillates the first and second gripping claws on an oscillatory axis crossing a longitudinal direction of each of the supporters, so as to change the orientation of a tip of each of the first and second gripping claws; and a bolt rotating mechanism for rotating, on the axis of the bolt, the bolt gripped by the first and second gripping claws.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3C is a view showing a state in which the gripping claw of the hand in the robot is oscillated;

DESCRIPTION OF THE EMBODIMENTS

Next, a description will be given below of embodiments embodying the present invention with reference to the accompanying drawings for the sake of understanding the present invention. Here, parts irrelevant to the description may be omitted in each of the drawings.

Figure 1:
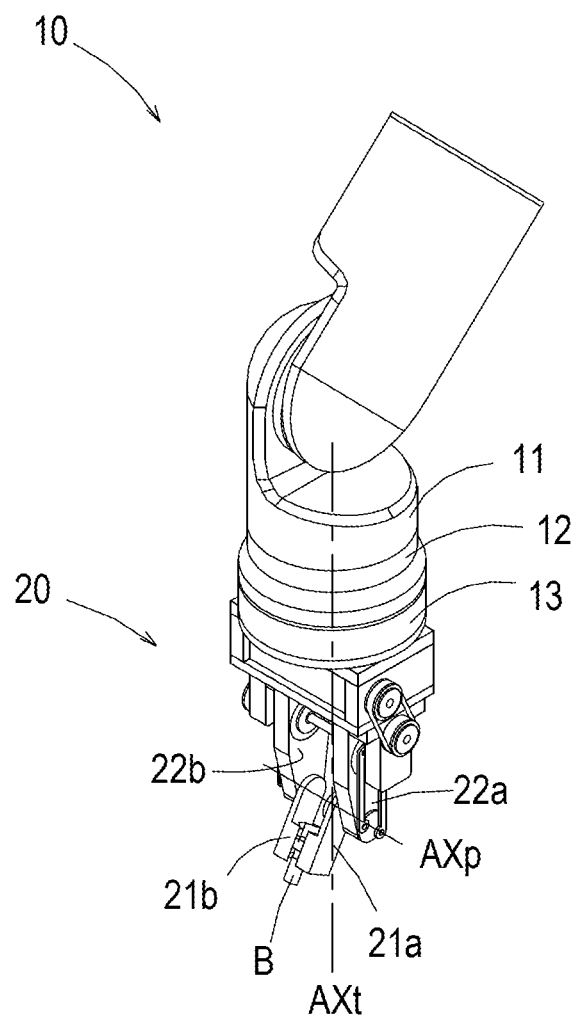
FIG. 1 is a perspective view showing an arm tip of a robot according to an embodiment of the present invention.

As shown in FIG. 1, a robot 10 according to an embodiment of the present invention is provided with a hand 20 at a tip of an arm 11. The hand 20 is disposed, via a force sensor 13, in a wrist flange 12 rotated on a rotational axis AXt defined at the tip of the arm 11. Incidentally, the hand 20 may be disposed in the wrist flange 12 without any force sensor 13. The robot 10 is, for example, a seven-axis articulated robot.

Figure 2:
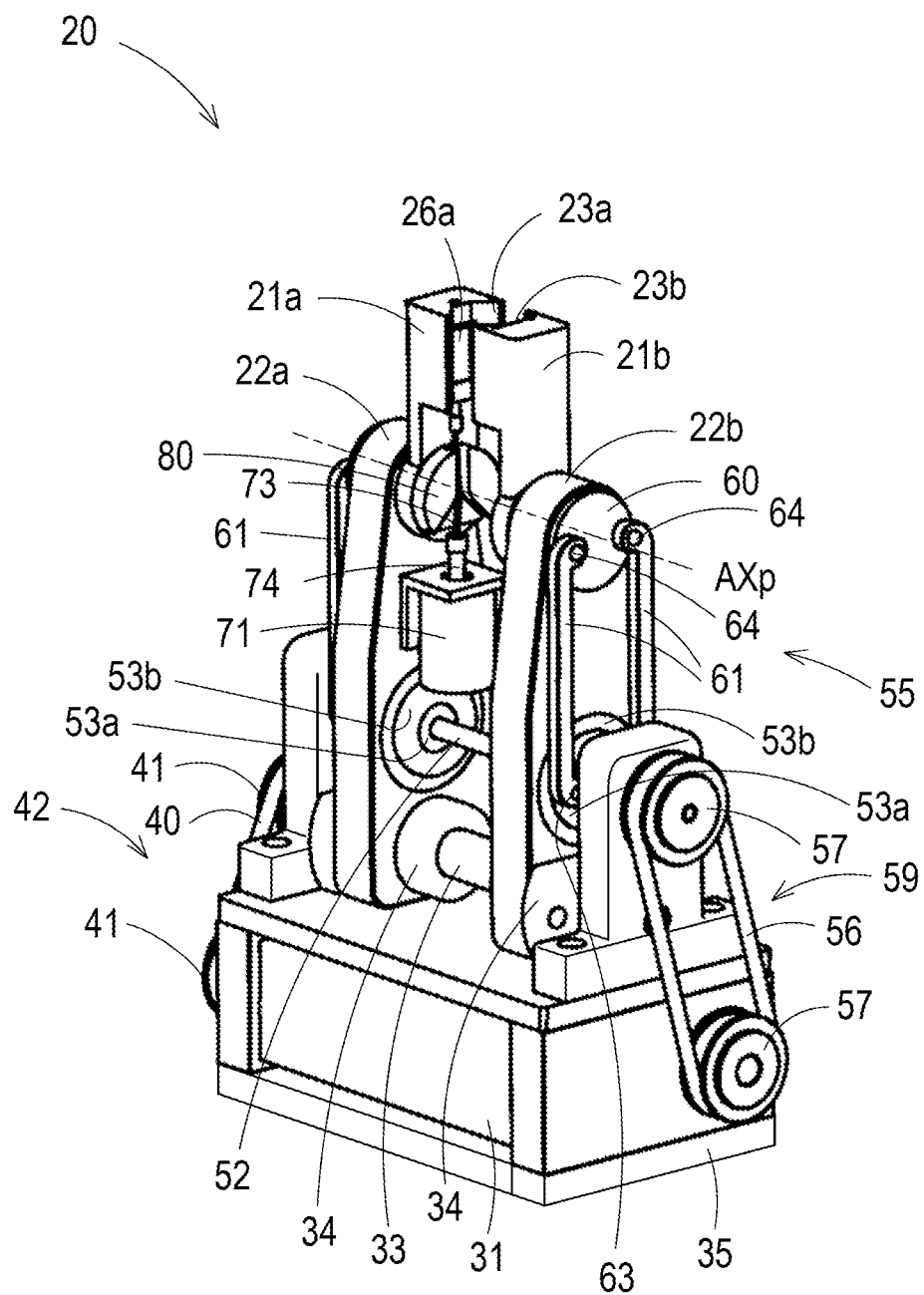
FIG. 2 is a perspective view showing a hand of the robot.

As shown in FIG. 2, the hand 20 includes a pair of first and second gripping claws 21a and 21b for gripping a bolt B (see FIG. 1). The gripping claws 21a and 21b are respectively supported at the tips of and inside of a pair of supporters 22a and 22b extending in the direction of the rotational axis AXt, for example. The gripping claws 21a and 21b are opened or closed along an oscillatory axis AXp crossing a longitudinal direction of each of the supporters 22a and 22b in association with the opening or closure of the supporters 22a and 22b, thereby gripping the bolt B.

Figure 4:
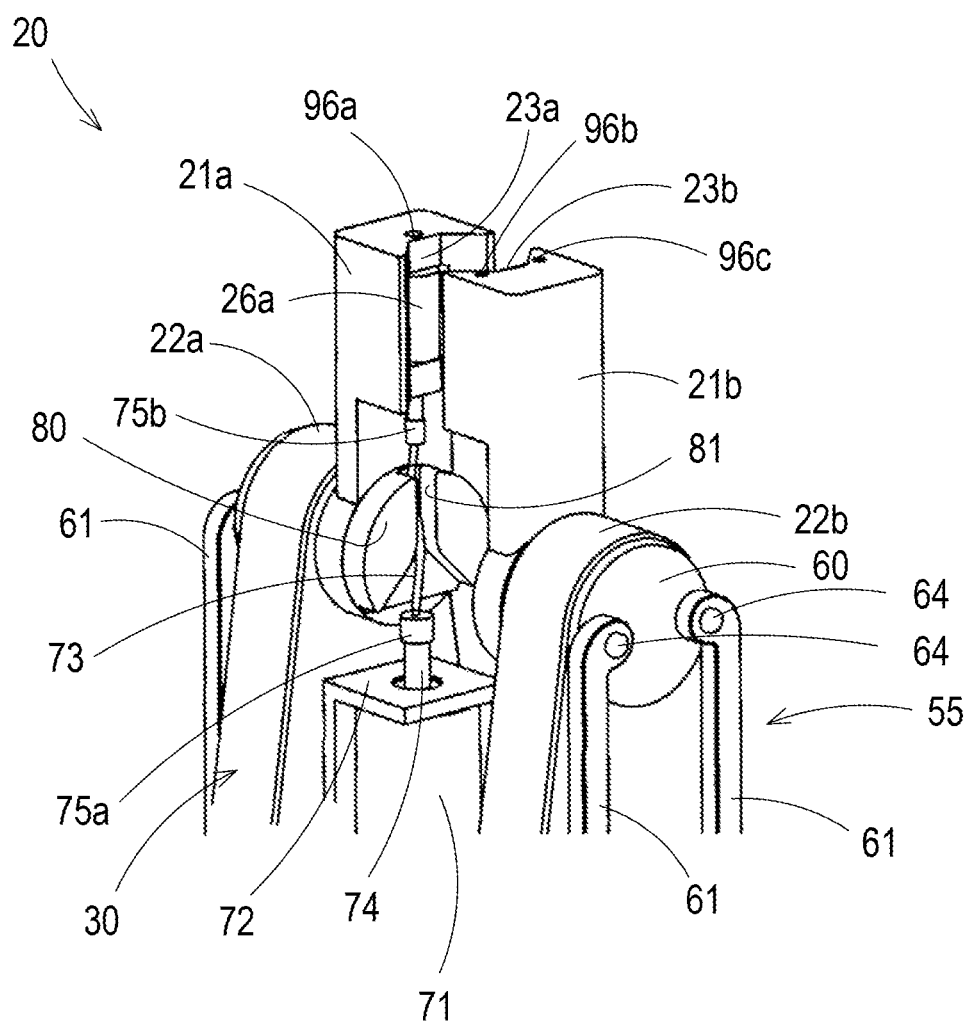
FIG. 4 is a perspective view showing a tip of the hand of the robot.
Figure 6:
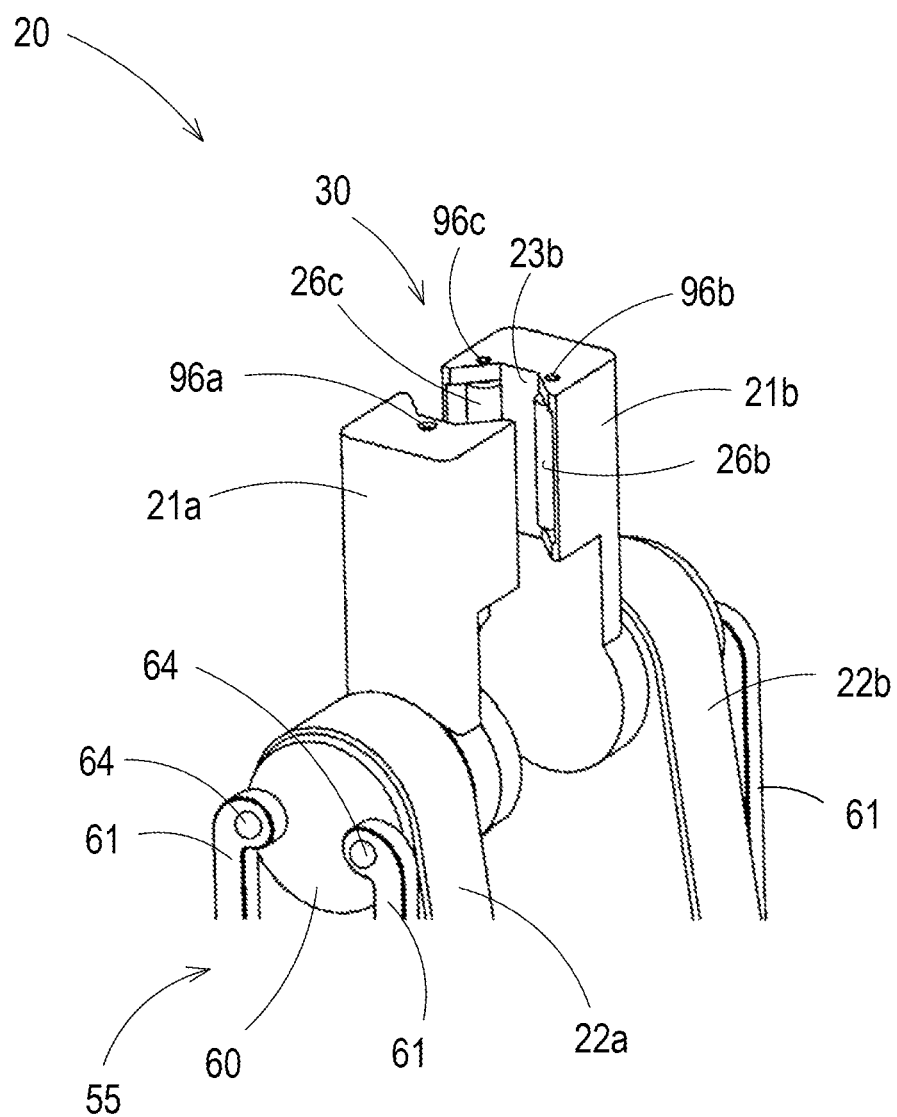
FIG. 6 is a perspective view showing the tip of the hand of the robot, as viewed at an angle other than that of FIG. 4.

The gripping claws 21a and 21b are oscillated on the oscillatory axis AXp, and therefore, their tips are changed in orientation. The gripping claws 21a and 21b project inward except their bases. As shown in FIGS. 4 and 6, cavities 23a and 23b are formed opposite to each other inside of each of projecting portions. One drive roller 26a is disposed in one cavity 23a whereas first and second driven rollers 26b and 26c are disposed in the other cavity 23b.

In addition, the gripping claws 21a and 21b (in particular, the drive roller 26a and the first and second driven rollers 26b and 26c) allow the gripped bolt B to be rotated on the axis of the bolt B.

Here, an operation for opening or closing the gripping claws 21a and 21b (the supporters 22a and 22b) is achieved by an opening/closing mechanism 28. Moreover, an operation for oscillating the gripping claws 21a and 21b on the oscillatory axis AXp so as to change the orientation of the gripping claws 21a and 21b is achieved by an oscillating mechanism 29. Additionally, an operation for rotating the gripped bolt B on the axis of the bolt B is achieved by a bolt rotating mechanism 30 (see FIG. 3A). Hereinafter, a description is made on each of the mechanisms.

(Opening/Closing Mechanism)

Figure 3A:
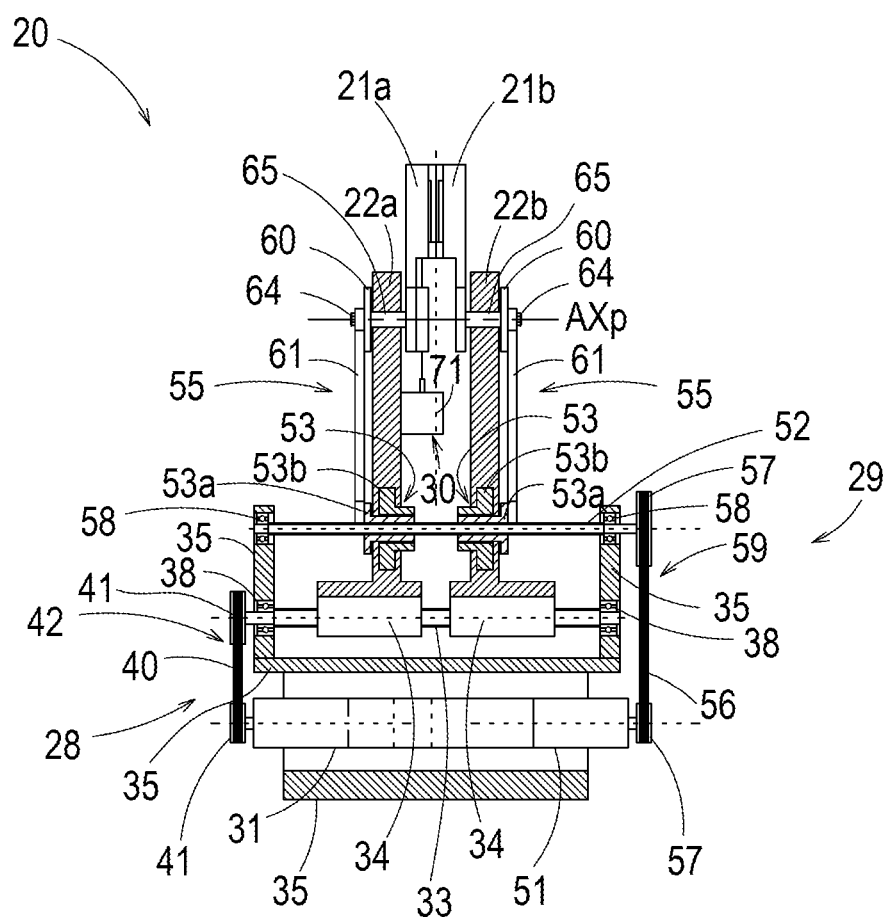
FIG. 3A is a view schematically showing an inside structure in a state in which a gripping claw of the hand in the robot is closed.

As shown in FIGS. 2 and 3A, the opening/closing mechanism 28 includes an opening/closing servo motor 31, a lengthwise screw shaft 33 to be rotated by the opening/closing servo motor 31, and a pair of movers 34 which move in directions reverse to each other according to the rotation of the lengthwise screw shaft 33.

The opening/closing servo motor 31 is fixed to a frame 35 at the base of the hand 20 such that its longitudinal direction is parallel to the oscillatory axis AXp. The term "parallel" herein does not signify "parallel" in the strictest sense. In other words, "parallel" signifies "substantially parallel" while errors are permitted from the viewpoints of a design and fabrication (hereinafter in the same manner). Furthermore, the opening/closing servo motor 31 is arranged such that its load side is oriented outside of the hand 20. Here, an encoder, not shown, disposed in the opening/closing servo motor 31 may be an absolute value encoder. A backup battery, not shown, for the absolute value encoder is fixed to the frame 35.

The lengthwise screw shaft 33 is rotatably supported by bearings 38 disposed in the frame 35. In addition, the lengthwise screw shaft 33 is disposed in parallel to the longitudinal direction of the opening/closing servo motor 31 nearer a tip of the hand 20 than the opening/closing servo motor 31. Moreover, the lengthwise screw shaft 33 is provided with screws reverse to each other (i.e., right and left screws) on one and the other sides thereof. The lengthwise screw shaft 33 is driven by the opening/closing servo motor 31 via a first belt pulley unit 42 including a timing belt 40 and a pulley 41.

The pair of movers 34 are moved by the right and left screws formed on the lengthwise screw shaft 33, respectively. In other words, the pair of movers 34 are moved in directions reverse to each other along the axial direction of the lengthwise screw shaft 33 according to the rotation of the lengthwise screw shaft 33. To the movers 34 are fixed the base ends of the pair of supporters 22a and 22b, respectively.

(Oscillating Mechanism)

As shown in FIGS. 2, 3A, and 3C, the oscillating mechanism 29 includes an oscillating servo motor 51, a splined shaft 52 and a pair of splined nut units 53 which are adapted to transmit the drive force of the oscillating servo motor 51, and a pair of link units 55.

The oscillating servo motor 51 is fixed to the frame 35 at the base of the hand 20 such that its longitudinal direction is parallel to the oscillatory axis AXp. Moreover, the oscillating servo motor 51 is arranged in an orientation reverse to the opening/closing servo motor 31. Additionally, the oscillating servo motor 51 is juxtaposed with the opening/closing servo motor 31, as the hand 20 is viewed sideways (as viewed on a load side of the oscillating servo motor 51 or the opening/closing servo motor 31). Consequently, the hand 20 is miniaturized more than in the case where neither the oscillating servo motor 51 nor the opening/closing servo motor 31 is arranged.

Incidentally, an encoder, not shown, disposed in the oscillating servo motor 51 may be an absolute value encoder. A backup battery, not shown, for the absolute value encoder is fixed to the frame 35.

The splined shaft 52 is rotatably supported via bearings 58 disposed in the frame 35 nearer the tip of the hand 20 than the lengthwise screw shaft 33. Moreover, the splined shaft 52 is disposed in parallel to the longitudinal direction of the oscillating servo motor 51 nearer the tip of the hand 20 than the oscillating servo motor 51. The splined shaft 52 is driven by the oscillating servo motor 51 via a second belt pulley unit 59 including a timing belt 56 and a pulley 57.

Each of the pair of splined nut units 53 includes a first splined nut 53a positioned on an inner circumferential side and a second splined nut 53b positioned on an outer peripheral side.

The first splined nut 53a can be rotated together with the splined shaft 52, and further, be moved in the axial direction of the splined shaft 52. Furthermore, the first splined nut 53a is exemplified by a ball splined inner nut.

On the other hand, the second splined nut 53b can be moved along the rotary shaft of the splined shaft 52 together with the first splined nut 53a, and further, be rotated relatively to the first splined nut 53a on the rotary shaft of the first splined nut 53a. The second splined nut 53b is fixed inside of the base ends of the supporters 22a and 22b. Additionally, the second splined nut 53b is exemplified by a ball splined outer nut.

Each of the link units 55 is provided with a disk 60 rotated on the oscillatory axis AXp and a pair of rod-like links 61 for connecting the disk 60 and the first splined nut 53a to each other. A link mechanism is designed to transmit the rotation of the first splined nuts 53a to the first and second gripping claws 21a and 21b, respectively.

Each of the links 61 is connected at one end thereof to a pair of first link pins 63 projecting toward the outside end of the first splined nut 53a. The first link pins 63 are arranged symmetrically with respect to the rotary shaft of the first splined nut 53a, as viewed in the direction of the rotary shaft of the first splined nut 53a. The term "symmetrically" herein does not signify "symmetrically" in the strictest sense. In other words, "symmetrically" signifies "substantially symmetrically" while errors are permitted from the viewpoints of a design and fabrication (hereinafter, in the same manner). One end of each of the links 61 is rotatably connected on the axis of the first link pin 63.

On the other hand, the other end of each of the links 61 is connected to a pair of second link pins 64 projecting outward of the disk 60. The second link pins 64 are arranged symmetrically with respect to the oscillatory axis AXp, as viewed in the direction of the oscillatory axis AXp. The other end of each of the links 61 is rotatably connected on the axis of the second link pin 64.

One end of a shaft 65 having the oscillatory axis AXp as the rotational center is secured at the rotational center of the inside surface of the disk 60. To the other end of the shaft 65 are fixed the base ends of the first and second gripping claws 21a and 21b inside of the supporters 22a and 22b.

(Bolt Rotating Mechanism)

As shown in FIGS. 2, 3A, and 4 to 6, the bolt rotating mechanism 30 includes a bolt rotating motor 71, a torque transmitting wire 73, the drive roller 26a, and the first and second driven rollers 26b and 26c.

Figure 5:
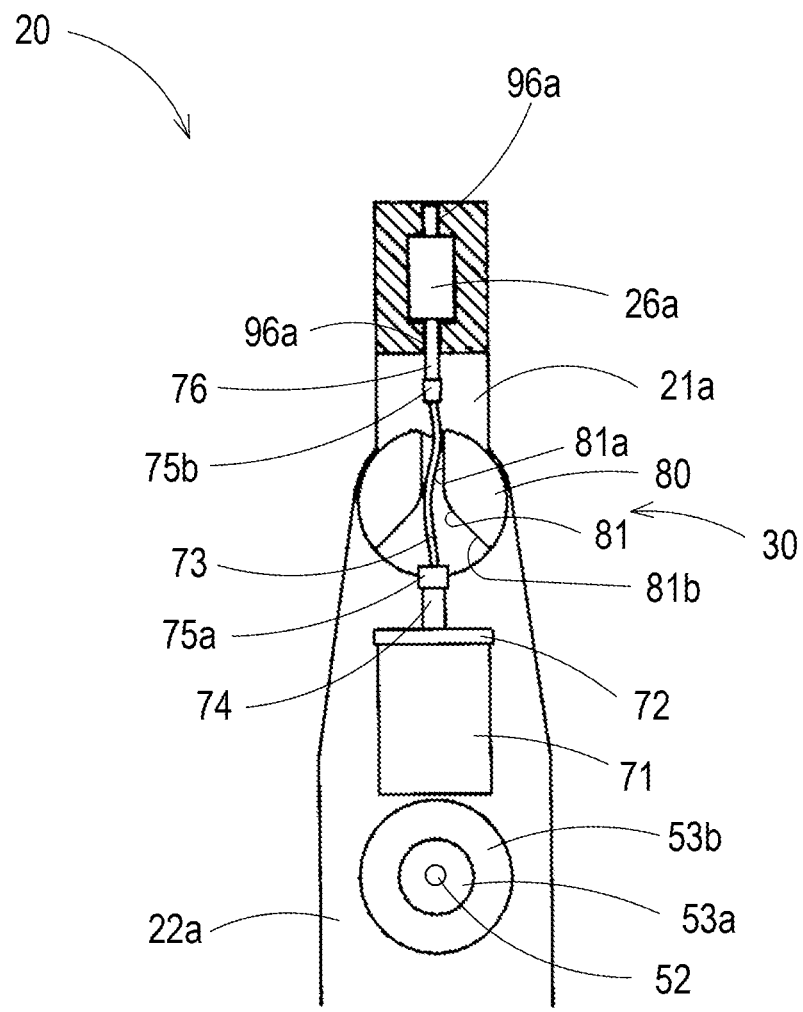
FIG. 5 is a partially side cross-sectional view showing the tip of the hand of the robot.

As shown in FIGS. 4 and 5, the bolt rotating motor 71 is provided with a shaft 74 via a bracket 72 inside of the supporter 22a while the tip of the shaft 74 is oriented upward (i.e., in the state in which the tip of the shaft 74 is oriented in a direction of the base end of the first gripping claw 21a). The bolt rotating motor 71 is exemplified by a DC motor with a decelerator or a pulse motor.

The torque transmitting wire (exemplifying a rotation transmitter) 73 is a bendable wire. The torque transmitting wire 73 is secured at one end thereof to the shaft 74 of the bolt rotating motor 71 via a connecting tool 75a, so as to transmit the rotation (i.e., torque) of the bolt rotating motor 71 toward the other end. Moreover, the torque transmitting wire 73 is laid in a groove 81 formed in a wire guide 80 made of a resin. In consideration of the oscillation of the gripping claw 21a, the length of the torque transmitting wire 73 is set such that slack is produced when the tip of the gripping claw 21a is oriented upward. As a consequence, when the bolt rotating motor 71 is rotated, the torque transmitting wire 73 is twisted. However, the torque transmitting wire 73 is guided through the groove 81 formed in the wire guide 80, to be thus suppressed from being deformed during the transmission of the rotation. The wire guide 80 is fixed to the first gripping claw 21a supported by the supporter 22a having the bolt rotating motor 71 disposed thereat, and therefore, can be rotated on the oscillatory axis AXp together with the first gripping claw 21a.

As shown in FIG. 5, the groove 81 includes a first groove portion 81a and a second groove portion 81b which are connected to each other at the rotational center of the wire guide 80. The first groove portion 81a is formed into a rectangular shape, as viewed in front (i.e., as viewed from the inside of the gripping claw 21a). Specifically, the first groove portion 81a is formed in such a manner as to extend upward of the rotational center of the wire guide 80 when the tip of the gripping claw 21a is oriented upward. On the other hand, the second groove portion 81b is formed into a sectorial shape, as viewed in front. The sector is symmetric with respect to the symmetric axis in a vertical direction when the tip of the gripping claw 21a is oriented upward, and further, has a center angle greater than an oscillatory angle of the gripping claw 21a.

Figure 7:
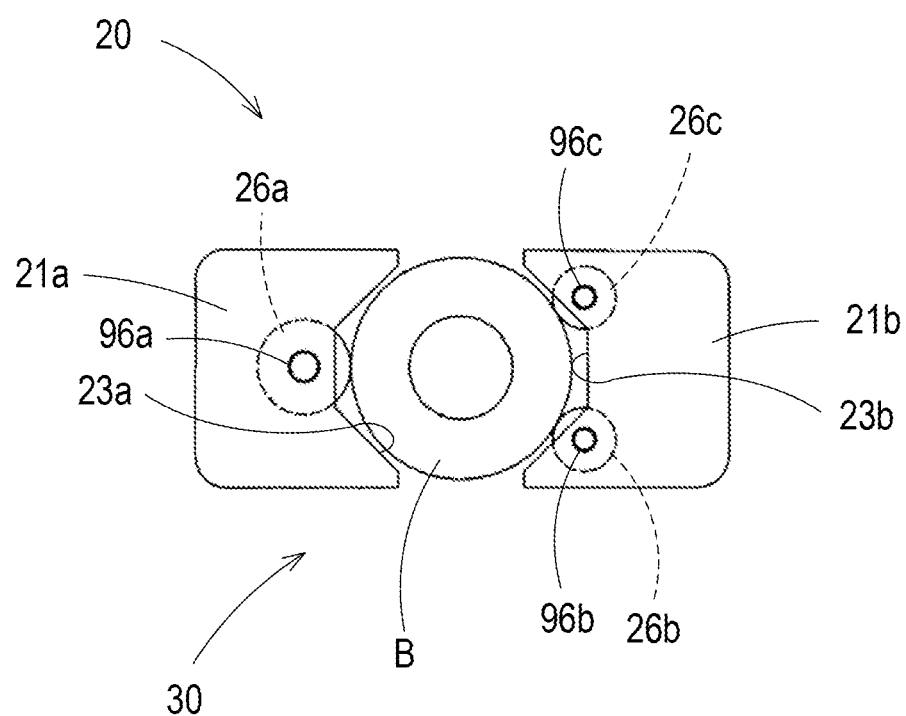
FIG. 7 is a plan view showing the tip of the hand of the robot.

As described above, the drive roller 26a is disposed in the cavity 23a of the first gripping claw 21a. More particularly, the drive roller 26a is disposed in the cavity 23a via a bearing 96a in such a manner that a part of its outer peripheral surface projects from the surface of the cavity 23a (see FIG. 7). The drive roller 26a is adapted to rotate, on the axis of the bolt B, the bolt B gripped by the first gripping claw 21a, that is, in contact with the drive roller 26a. In other words, the drive roller 26a rotates on the axis parallel to the axis of the bolt B. As shown in FIG. 5, a shaft 76 is coaxially disposed at the base end of the drive roller 26a, and then, the tip of the shaft 76 is fixed to the other end of the torque transmitting wire 73 via a connecting tool 75b. The drive roller 26a is made of metal, and further, is covered with rubber at the outer peripheral surface which is brought into contact with the bolt B.

The first and second driven rollers 26b and 26c are provided in the cavity 23b of the second gripping claw 21b, as described above (see FIG. 6). Particularly, the first and second driven rollers 26b and 26c are provided in the cavity 23b via bearings 96b and 96c, respectively, in such a manner that a part of each of their outer peripheral surfaces projects from the surface of the cavity 23b (see FIG. 7). The first and second driven rollers 26b and 26c are rotated on the axis parallel to the axis of the bolt B. As a consequence, the first and second driven rollers 26b and 26c are rotated in contact with the bolt B rotated by the drive roller 26a. At least two driven rollers are disposed. The first and second driven rollers 26b and 26c are made of metal, and further, are covered with rubber at the outer peripheral surfaces which are brought into contact with the bolt B.

Here, although the drive roller 26a is disposed in the first gripping claw 21a whereas the first and second driven rollers 26b and 26c are disposed in the second gripping claw 21b, the drive roller 26a and the second driven roller 26c may be disposed in the first gripping claw 21a whereas the first driven roller 26b may be disposed in the second gripping claw 21b. That is to say, any combinations are allowed as long as the bolt B is supported at three points by at least three rollers, at least one of which may be a drive roller.

Next, descriptions will be given below of the operations of the hand 20 (i.e., the opening/closing operation, oscillation operation, and bolt rotating operation of the gripping claws 21a and 21b).

(Opening/Closing Operation)

When the opening/closing servo motor 31 shown in FIG. 3A is rotated in one direction, the rotation is transmitted via the first belt pulley unit 42, and then, the lengthwise screw shaft 33 is rotated. Since the lengthwise screw shaft 33 includes the right and left screws, the movers 34 are moved inward along the lengthwise screw shaft 33. According to the movement of the movers 34, the distance between the supporters 22a and 22b fixed to the movers 34, respectively, is narrowed, and thus, the gripping claws 21a and 21b are closed.

Incidentally, the supporters 22a and 22b are fixed to the splined nut unit 53 (more particularly, the second splined nut 53b) in the oscillating mechanism 29, the splined nut unit 53 (more particularly, the first splined nut 53a) is freely moved along the splined shaft 52. Consequently, the fixture of the gripping claws 21a and 21b to the splined nut unit 53 of the oscillating mechanism 29 does not prevent the opening/closing operation of the gripping claws 21a and 21b.

Figure 3B:
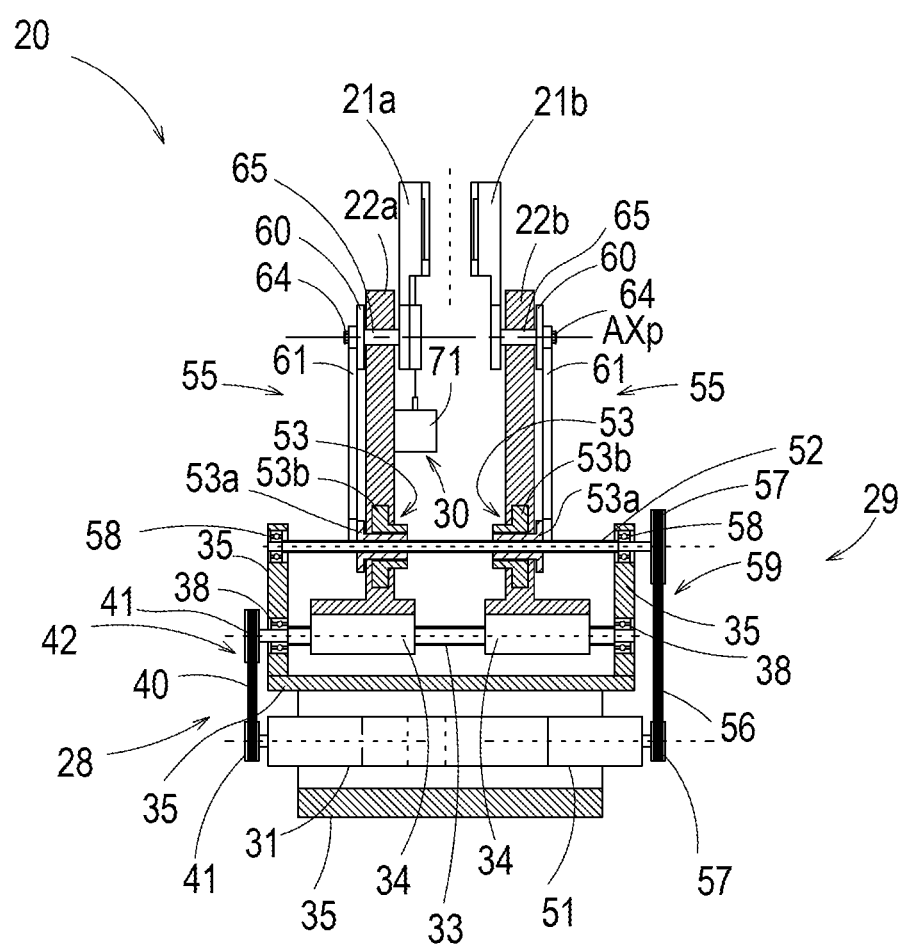
FIG. 3B is a view schematically showing an inside structure in a state in which the gripping claw of the hand in the robot is opened.

In contrast, when the opening/closing servo motor 31 is rotated in the reverse direction, it is obvious that the gripping claws 21a and 21b are opened, as shown in FIG. 3B. Therefore, its description will be omitted.

(Oscillating Operation)

When the oscillating servo motor 51 shown in FIG. 3A is rotated in one direction, the rotation is transmitted via the second belt pulley unit 59, and then, the splined shaft 52 is rotated. The rotation of the splined shaft 52 is transmitted to the first splined nut 53a of the splined nut unit 53, and then, the first splined nut 53a is rotated. At this time, the second splined nut 53b is freely rotated on the axis of the splined shaft 52 irrespective of the rotation of the first splined nut 53a (the splined shaft 52), so that the rotation of the first splined nut 53a is not transmitted to the supporters 22a and 22b.

When the first splined nut 53a is rotated, the link 61 is moved. Thereafter, the disk 60 and the shaft 65 are rotated on the oscillatory axis AXp via the link 61. As a consequence, the gripping claws 21a and 21b are freely oscillated on the oscillatory axis AXp, as shown in FIG. 3C. Here, the gripping claws 21a and 21b are positioned at an arbitrary angle by controlling the rotational angle of the oscillating servo motor 51.

(Bolt Rotating Operation)

When the bolt rotating motor 71 shown in FIGS. 4 and 5 is rotated, the torque transmitting wire 73 is twisted, and then, the rotation is transmitted to the tip of the torque transmitting wire 73. The rotation is further transmitted to the drive roller 26a, and thus, the drive roller 26a is rotated on the rotational axis. The rotation of the drive roller 26a is transmitted to the bolt B gripped in contact with the outer peripheral surfaces of the drive roller 26a and the first and second driven rollers 26b and 26c (see FIG. 7). Consequently, the bolt B is rotated on the axis of the bolt B, and further, the first and second driven rollers 26b and 26c shown in FIG. 6 are also rotated. In this manner, the bolt B is stably supported (gripped) at the three points by the drive roller 26a and the first and second driven rollers 26b and 26c.

Figure 8:
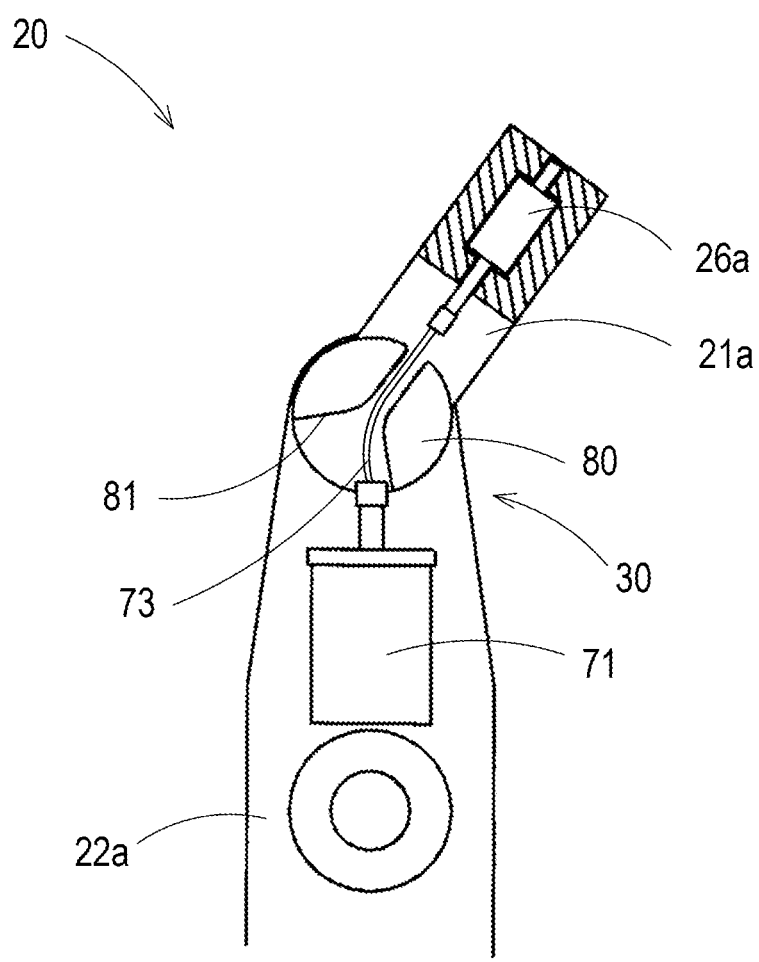
FIG. 8 is another partially side cross-sectional view showing the tip of the hand of the robot.

Here, the rotation of the bolt rotating motor 71 is transmitted to the drive roller 26a by the bent torque transmitting wire 73, and therefore, the drive roller 26a can be rotated irrespective of the orientation of the gripping claws 21a and 21b, as shown in FIG. 8.

Incidentally, the opening/closing mechanism 28, the oscillating mechanism 29, and the bolt rotating mechanism 30 are operated independently of each other, and therefore, the opening/closing operation, oscillating operation, and bolt rotating operation of the gripping claws 21a and 21b are carried out independently of each other.

Next, a description will be given below of an operation for inserting the bolt B into a tap hole by the robot 10.

The robot 10 moves the hand 20 near the bolt B to be gripped based on information on the position and attitude of the bolt B to be gripped, acquired from an image recognizer, not shown. Subsequently, the robot 10 rotates the entire hand 20 on the rotational axis AXt, and then, oscillates the gripping claws 21a and 21b on the oscillatory axis AXp so as to appropriately change the orientation of the bolt B in such a manner as to easily grip the bolt B, closes the gripping claws 21a and 21b, and thus, grips the bolt B.

For example, the robot 10 rotates the entire hand 20 such that the gripping claws 21a and 21b are parallel to the axis of the bolt B in the longitudinal direction, to oscillate the gripping claws 21a and 21b. Thereafter, the robot 10 allows the gripping claws 21a and 21b to approach the bolt B from above, thereby reducing the possibility of interference of the arm 11 with an article placed therearound, so as to grip the head of the bolt B.

Here, the force for gripping the bolt B is controlled by the opening/closing servo motor 31.

In this manner, the robot 10 rotates mainly the hand 20 to change the orientation of the gripping claws 21a and 21b without largely moving the arm 11, thereby gripping the bolt B. That is to say, it is unnecessary to largely change the attitude of the bolt B for the purpose of gripping in comparison with the case where the gripping claws 21a and 21b are not oscillated on the oscillatory axis AXp.

Thus, in comparison with the case where the gripping claws 21a and 21b are not oscillated on the oscillatory axis AXp, the attitude of the arm 11 for gripping the bolt B is slightly changed, so that a time required for gripping the bolt B is shortened. In addition, the robot 10 grips the bolt B in a wide range.

Subsequently, the robot 10 oscillates the gripping claws 21a and 21b so that the bolt B is inserted into a tap hole, and then, directs the tip of the gripped bolt B toward the tap hole. Moreover, the robot 10 controls the force of the arm 11, and thus, operates the bolt rotating mechanism 30 in a state in which a predetermined force is applied to the bolt B in the axial direction. When the bolt rotating motor 71 is rotated, and further, the drive roller 26a is rotated via the torque transmitting wire 73, the bolt B is rotated on the axis, to be thus inserted into the tap hole.

Incidentally, the present invention is not limited to the above-described embodiment, but it is modified within a scope without changing the feature of the present invention. For example, inventions implemented by combining a part or all of the above-described embodiment and modifications are encompassed within the technical scope of the present invention.

Although the rotation of the bolt rotating motor 71 is transmitted to the drive roller 26a via the torque transmitting wire 73 in the above-described embodiment, the torque transmitting wire 73 may be replaced with a shaft joined via a universal joint.

The link mechanism for use in the link unit 55 is arbitrary as long as it transmits the rotation of the first splined nut 53a to the shaft 65. For example, another link mechanism such as an oscillatory slider crank mechanism may be applied. Although the link unit 55 transmits the rotation of each of the first splined nuts 53a to the gripping claws 21a and 21b by the link mechanism, the link mechanism may be replaced with a belt pulley mechanism. However, the link mechanism is far preferable to the belt pulley mechanism from the viewpoint of the miniaturization of the tip of the hand 20.

Moreover, the first belt pulley unit 42 may be replaced with a rotation transmitting mechanism including gears such as spur gears.

Additionally, the opening/closing servo motor 31, the oscillating servo motor 51, the bolt rotating motor 71 are not limited to electromagnetic motors. At least one of the opening/closing servo motor 31, the oscillating servo motor 51, and the bolt rotating motor 71 may be a pneumatic motor.

As described above, in the hand and the robot according to the embodiment of the present invention, the gripped bolt is freely inserted into the tap hole.

What is claimed as new and is desired to be secured by Letters Patent of the United States is:

1. A hand comprising:
    a pair of supporters;
    first and second gripping claws which are rotatably supported by the pair of supporters, respectively, about an oscillatory axis that crosses a longitudinal direction of the pair of the supporters;
    an oscillating mechanism configured to oscillate the first and second gripping claws on the oscillatory axis; and
    a drive roller rotatably provided on one of the first and second gripping claws and configured to rotate about a rotation axis substantially parallel to a longitudinal direction of the one of the first and second gripping claws, wherein
    the drive roller is rotatably provided on the first gripping claw;
    a rotation motor disposed inside of the supporter supporting the first gripping claw;
    a rotation transmitter is provided that is configured to transmit the rotation of the rotation motor;
    the drive roller is disposed inside of a tip of the first gripping claw and driven by the rotation motor via the rotation transmitter;
    a first driven roller is disposed inside of a tip of the second gripping claw and rotatably supported on an axis substantially parallel to the longitudinal direction of the pair of supporters; and
    a second driven roller which is disposed inside of the tip of one of the first and second gripping claws and rotatably supported on an axis substantially parallel to the longitudinal direction of the pair of supporters.

2. The hand according to claim 1, wherein
    the rotation transmitter is a torque transmitting wire adapted to transmit torque.

3. The hand according to claim 2, further comprising, inside of the base end of the first gripping claw, a wire guide which is oscillated together with the first gripping claw and has a groove for guiding the torque transmitting wire, wherein
    the wire guide suppresses deformation of the torque transmitting wire caused by the oscillation of the first grip.

4. The hand according to claim 1, wherein
    the rotation transmitter is a shaft joined via a universal joint.

5. The hand according to claim 1, further comprising a roller drive source configured to rotate the drive roller.

6. The hand according to claim 5, wherein
    the roller drive source and the drive roller are connected with a wire that is deformed in accordance with the oscillation of the first and second griping claws about the oscillatory axis.

7. A hand comprising:
    a pair of supporters;
    first and second gripping claws which are rotatably supported by the pair of supporters, respectively, about an oscillatory axis that crosses a longitudinal direction of the pair of the supporters;
    an oscillating mechanism configured to oscillate the first and second gripping claws on the oscillatory axis; and
    a drive roller rotatably provided on one of the first and second gripping claws and configured to rotate about a rotation axis substantially parallel to a longitudinal direction of the one of the first and second gripping claws,
    wherein the oscillating mechanism includes:
        an oscillating servo motor;
        a splined shaft to be rotated by the oscillating servo motor;
        a pair of first splined nuts which are rotated on the rotational axis of the splined shaft together with the splined shaft and freely moved in the direction of the rotational axis of the splined shaft; and a pair of second splined nuts which are fixed to the pair of supporters, respectively, moved along the rotational axis of the splined shaft together with the first splined nuts, and freely rotated relatively to the first splined nuts on the rotational axes of the first splined nuts, respectively, and the first and second gripping claws are driven by the pair of first splined nuts, respectively, to be thus oscillated.

8. The hand according to claim 7, wherein
the first and second gripping claws are driven by the pair of first splined nuts via the link unit for transmitting the rotation by using a link mechanism.

9. The hand according to claim 7, further comprising an opening and closing mechanism that is configured to open the pair of supporters by moving the pair of supporters away from each other and close the pair of supporters by moving the pair of supporters towards each other along the oscillatory axis.

10. The hand according to claim 9, wherein
the opening and closing mechanism includes:
an opening and closing servo motor;
a lengthwise screw shaft is provided that has right and left screws formed reversely to each other, the screws configured to be rotated by the opening and closing motor; and
a pair of movers is provided that are configured to be moved in directions reverse to each other along the rotational axis of the lengthwise screw shaft according to the rotation of the lengthwise screw shaft, and the pair of supporters are fixed to the pair of movers, respectively.

11. The hand according to claim 10, wherein
the opening and closing servo motor and the oscillating servo motor are oriented reversely to each other, arranged in such a manner as to be substantially parallel to the oscillatory axis in their respective longitudinal directions, and disposed at the base of the hand.

12. A robot comprising:
a hand for gripping a bolt, the hand comprising:
a pair of supporters;
first and second gripping claws which are rotatably supported by the pair of supporters, respectively, about an oscillatory axis that crosses a longitudinal direction of the pair of the supporters;
an oscillating mechanism configured to oscillate the first and second gripping claws on the oscillatory axis; and
a drive roller rotatably provided on one of the first and second gripping claws and configured to rotate about a rotation axis substantially parallel to a longitudinal direction of the one of the first and second gripping claws,
wherein the hand further comprises an opening and closing motor configured to open the pair of supporters by moving the pair of supporters away from each other and close the pair of supporters by moving the pair of supporters towards each other.

13. The robot according to claim 12, wherein
the hand further comprises a roller drive source configured to rotate the drive roller.

14. The robot according to claim 13, wherein
the roller drive source and the drive roller are connected with a wire that is deformed in accordance with the oscillation of the first and second griping claws about the oscillatory axis.

15. A robot comprising:
a hand for gripping a bolt, the hand comprising:
a pair of supporters;
first and second gripping claws which are rotatably supported by the pair of supporters, respectively, about an oscillatory axis that crosses a longitudinal direction of the pair of the supporters;
an oscillating mechanism configured to oscillate the first and second gripping claws on the oscillatory axis; and
a drive roller rotatably provided on one of the first and second gripping claws and configured to rotate about a rotation axis substantially parallel to a longitudinal direction of the one of the first and second gripping claws, wherein
the drive roller is rotatably provided on the first gripping claw;
a rotation motor disposed inside of the supporter supporting the first gripping claw;
a rotation transmitter is provided that is configured to transmit the rotation of the rotation motor;
the drive roller is disposed inside of a tip of the first gripping claw and driven by the rotation motor via the rotation transmitter;
a first driven roller is disposed inside of a tip of the second gripping claw and rotatably supported on an axis substantially parallel to the longitudinal direction of the pair of supporters; and
a second driven roller which is disposed inside of the tip of one of the first and second gripping claws and rotatably supported on an axis substantially parallel to the longitudinal direction of the pair of supporters.

* * * * *